United States Patent [19]

Segarra et al.

[11] Patent Number: 4,495,493
[45] Date of Patent: Jan. 22, 1985

[54] METHOD OF CONTROLLING THE TRANSMISSION/RECEPTION OF DATA IN A LOCAL COMMUNICATION NETWORK, AND DATA TRANSMISSION SYSTEM FOR PERFORMING THE METHOD

[75] Inventors: Gerard Segarra, Jossigny; Jean L. Allain, Saclay, both of France

[73] Assignee: U.S. Philips Corporation, New York, N.Y.

[21] Appl. No.: 367,696

[22] Filed: Apr. 12, 1982

[30] Foreign Application Priority Data

Apr. 15, 1981 [FR] France ................. 81 07558

[51] Int. Cl.³ .............................................. H04Q 9/00
[52] U.S. Cl. .................................. 340/825.5; 370/86; 370/98; 340/825.05
[58] Field of Search .......... 340/825.5, 825.51, 825.05; 370/89, 98, 85, 86

[56] References Cited

U.S. PATENT DOCUMENTS 4,127,845 11/1978 Dansbach et al. ............... 340/825.5
4,342,995 8/1982 Shima ................................ 340/825.5

Primary Examiner—Donald J. Yusko
Attorney, Agent, or Firm—Jack E. Haken; James J. Cannon, Jr.

[57] ABSTRACT

The method for use in a local network comprising a pilot station and local stations. Each station of the network is successively allocated the right to transmit a message on the transmission medium on which the messages are transported. This right to transmit is allocated to a station when its own address is indicated by its address indicator. The transmission of a message by the station having the right to transmit increments the address indicator of all stations, thus allocating the right to transmit to a next station. If a station remains silent when it has the right to transmit, the pilot station substitutes for the silent station. The method also concerns the detection of errors and the recuperation of incorrect messages. Each station of the system has a table which makes the state of the other local stations known at any instant.

10 Claims, 10 Drawing Figures

| | |
|---|---|
| 1 | CA-NL |
| 2 | CA-NH |
| 3 | REJ-NL |
| 4 | REJ-NH |
| 5 | COT-NL |
| 6 | COT-NH |
| 7 | CTC1-NL |
| 8 | CTC1-NH |
| 9 | CTC2-NL |
| 10 | CTC2-NH |
| 11 | |
| 12 | |
| 13 | |
| 14 | |
| 15 | |
| 16 | |

| | |
|---|---|
| 1 | CA-NL |
| 2 | CA-NH |
| 3 | DESTAD-L |
| 4 | DESTAD-H |
| 5 | |
| 6 | |
| 7 | |
| 8 | |
| 9 | |
| 10 | |
| 11 | |
| 12 | |
| 13 | |
| 14 | |
| 15 | |
| 16 | |

METHOD OF CONTROLLING THE TRANSMISSION/RECEPTION OF DATA IN A LOCAL COMMUNICATION NETWORK, AND DATA TRANSMISSION SYSTEM FOR PERFORMING THE METHOD

BACKGROUND OF THE INVENTION

1. Field of the Invention

The present invention relates to a method of controlling the transmission/reception of data in a local communication network, comprising a plurality of transmitter/receiver stations, each of which is connected to a transmission medium for the transport of data, said stations forming a logic communication loop, each station having its own address and comprising an address indicator, said method comprising the following steps:
(a) the location of the right to transmit to the station whose address corresponds to the address indicated by the address indicator;
(b) transmission of a single message by the station having the right to transmit and, if this station has no information to be transmitted when it is allocated the right to transmit, the transmission of a presence message by said station;
(c) advancing of said address indicators by one position by an end-of-message indication of the message transmitted by the station having the right to transmit;
(d) the resetting of said address indicators when each of said stations has had the right to transmit.

2. Description of the Prior Art

A method of this kind is used in the data transmission system described in U.S. Pat. No. 4,017,841. The system described in said U.S. patent comprises a plurality of stations which are connected to a transmission medium for the transport of data. The address indicator of each station is formed by an allocation counter and its address is formed by a number. The allocation counters are all synchronized and each station is allocated the right to transmit when its allocation counter indicates its number. If a station does not have any message to be transmitted, it transmits a presence message which is in this case simply the end-of-message indication whereby each information message transmitted is normally terminated. The end-of-message indication in its turn increments the allocation counters of the various stations. When each station has had the right to transmit, all allocation counters are reset to zero, so that a new cycle is started during which each station will again be allocated the right to transmit.

A great future is predicted for local communication networks because they concern industrial or private applications, teledistribution of messages, texts, sound or images; for these applications, the local stations may be television receivers, telephones, industrial machines, computers or peripheral equipment; the transmission medium, also referred to as channel, is physically formed by a network of coaxial cables or optical fibers or any other high-frequency data transport means.

The drawback of the control method used in the data transmission system according to U.S. Pat. No. 4,017,841 consists in the fact that if a station which has the right to transmit remains silent, the entire system stops because it remains locked to this silent station. Because this station is silent, it does not transmit the end-of-message indication, so that the allocation counters are not incremented and the right to transmit is not allocated to the next station of the logic communication loop; such a silence is a quite normal situation, for example, in office applications where a station may be disconnected in the absence of the user.

SUMMARY OF THE INVENTION

The present invention has for its object to provide a method where intervention takes place when a station having the right to transmit remains silent. In a local communication network a method of controlling the transmission/reception of data in accordance with the invention is characterized in that it comprises:
detection by a predetermined station, referred to as the pilot station, of the absence of transmission of a message of any type by the station having the right to transmit;
transmission by said pilot station of a substitution message after the detection of said absence of transmission.

Because the address indicators, for example, allocation counters, are incremented by the position by the end-of-message indication, for example, the trailing edge of the carrier of a transmitted message, the end-of-message indication of the substitution message transmitted by the pilot station will increment the address indicators of the various stations, thus allocating the right to transmit to next station. In such a system, a silent station cannot block the entire system.

In a data transmission system in which each message received by a station is stored in a memory of limited capacity, the method in accordance with the invention is notably characterized in that a rejection signal is transmitted on the transmission medium by the receiving station in the case of overflow of the memory of limited capacity. The station transmitting the message causing the overflow of the memory can thus be informed about the problem. It is to be noted, however, that the transmission of a rejection signal is a method which is used in systems in which the receiving station verifies, in conformity with a given standard, the message just received. The rejection signal is transmitted by the receiving station when the verification reveals nonconformity. Systems of this kind are described, for example, in an article by Mr. Michel Martin, published in ZERO UN INFORMATIQUE, No. 146, December 1980–January 1981, pages 78 to 82. When a meassage transmitted on the channel has caused a rejection signal, the transmitting station which has noticed this rejection may retransmit said message on the channel. When the transmitting station must be released by the receiving station (stations) before giving the right to transmit to a next station, the channel is not utilized, so that time is lost and the efficiency of the system decreases. This drawback is eliminated by the method in accordance with the invention. The method in accordance with the invention is notably characterized in that said retransmission of said message takes place during a next allocation of said right to transmit to said transmitting station. As a result of the transmission during a next allocation of the right to transmit, there is neither a loss of time nor a loss of efficiency of the system.

The method in accordance with the invention is preferably characterized in that after the transmission of a message and between two successive allocations of the right to transmit, each rejection signal concerning the transmitted message is stored by the transmitting station and also the address of the station having transmitted the rejection signal, said message being retransmitted by the transmitting station upon the next allocation of the right to transmit to said transmitting station. Because it has stored the address of the station (or stations) having transmitted a rejection signal, i.e. the station or stations which have not correctly received the transmitting message, the station transmitting the message is informed about the problem, so that it can take into account and even attempt to resolve the problem during its next transmission allocation.

In the case where a message comprises several bits which are arranged in a defined order, a method in accordance with the invention is notably characterized in that the transmission of the rejection signal is realized by setting at least one bit in a first given location to a given value. The transmitting station recognizes, on the basis of the value of the bit in the given location in the message emitted by the receiving station whether or not the transmitted message has been "rejected".

According to the same idea, the retransmitted message comprises at least one bit which is set to a given value in a second given location of the message in order to indicate that the message is retransmitted. The receiving station thus recognizes the "repeated" messages.

When the resetting of said address indicators is realized by means of a resetting message transmitted by the pilot station, a method in accordance with the invention is notably characterized in that, when a station other than the pilot station (a station which referred to as a local station) starts to use the transmission medium, an observation cycle is performed by said local station, said cycle comprising:
(a) waiting by said local station for a resetting message to be transmitted by the pilot station;
(b) reception of the resetting message;
(c) waiting for the indication of its own address by its address indicator;
(d) when its own address is indicated by its address indicator, verification of the transmission by the pilot station of a substitution message and upon reception of said substitution message, the termination of the observation cycle;
(e) when said substitution message is not received when its own address is indicated by its address indicator, activating an error signal.

Thus, the connection of a station is realized without problems.

The invention also relates to a data transmission system using the method in accordance with the invention. A data transmission system of this kind is characterized in that the pilot station comprises an inactive time counter for counting the duration of the inactivity of a station having the right to transmit and for generating said substitution message when the inactive-time counter exceeds a predetermined value. The inactivity counter is started when the right to transmit is allocated to the station. When a predetermined period of time is exceeded, a substitution message is transmitted.

A preferred embodiment of a data transmission system in accordance with the invention comprises "n+1" (n∈ℕ) transmitter/receiver stations, each local station thereof, having a number from 1 to n as its own address, said pilot station bearing the number 0, each station having an allocation counter as its address indicator. The system is characterized in that each local station comprises means for the detection of a substitution message, an input of said detection means being connected to an output of said allocation counter in order to receive the value indicated by the allocation counter, said detection means comprising a memory for storing the number of a station which has been the subject of a substitution message. Since they have been informed about the absence or the non-activity of a station, the other stations can take this fact into account, for example, by not transmitting messages to the absent number.

For a data transmission system in which each station comprises means for identifying the type of message, a further preferred embodiment in accordance with the invention is characterized in that said means for identifying the type of message have an input connected to an output of said allocation counter in order to receive the value indicated by the allocation counter, said means for identifying the type of the message comprising a memory for memorizing a station which has been the subject of either a substitution message or a rejection signal. Each station is thus informed about the state of the other stations in order to take into account this state.

The embodiment of a local communication network in accordance with the invention offers other advantages: the elimination of collisions, retransmission of incorrect messages, elaboration of network control data.

BRIEF DESCRIPTION OF THE DRAWINGS

The invention will be described hereinafter with reference to the following figures.

DESCRIPTION OF THE PREFERRED EMBODIMENT

Figure 1A:
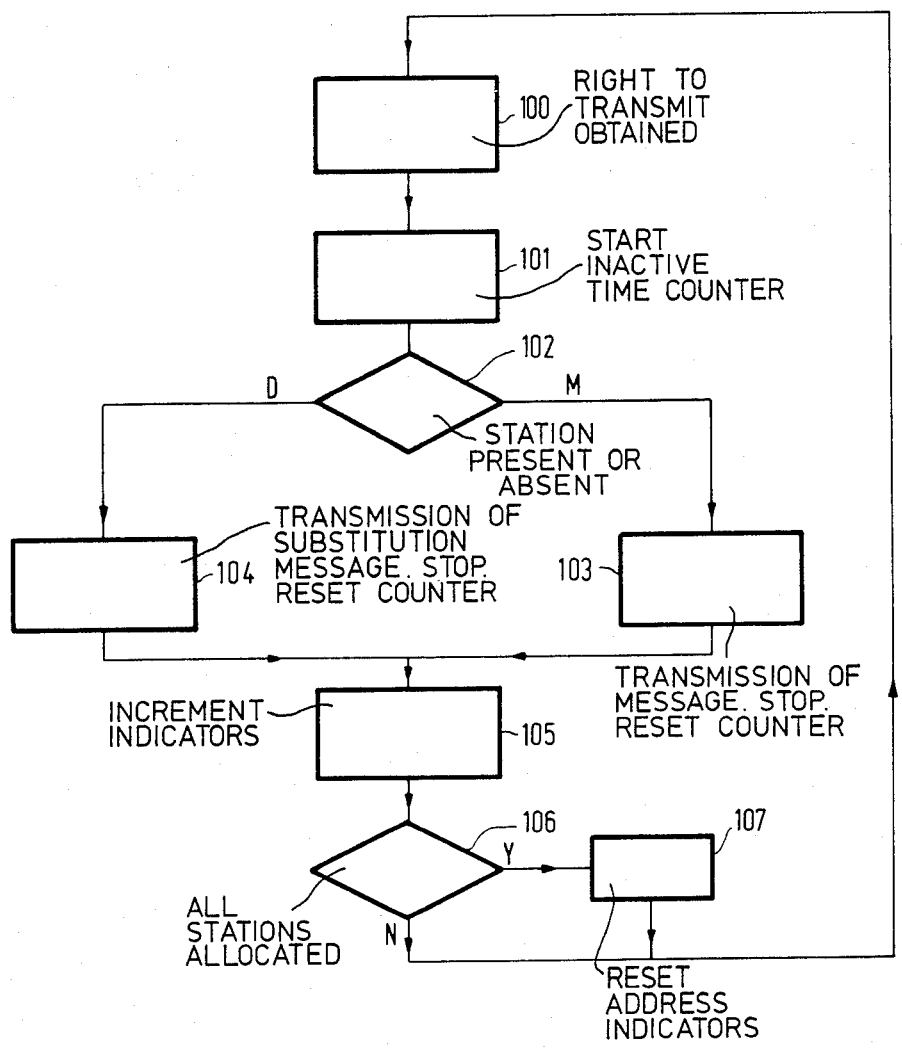
FIG. 1a is a general representation of the control method in accordance with the invention in the form of a diagram.

FIG. 1a shows a general diagram of the control method in accordance with the invention. The method is used for the transmission/reception of data in a local communication network comprising a plurality of stations which can act as transmitters as well as receivers. Each of the stations is connected to a transmission medium, also referred to as channel, for the transport of data, notably data in the form of messages. Each station has its own address and comprises an address indicator, for example, a pointer which successively indicates the various addresses in a list containing the addresses of the various stations or, when its own address is formed by a number, the address indicator may be formed simply by an allocation counter. One station, referred to as the pilot station, has a privileged function with respect to the other stations which are referred to as local stations. This privileged function will become apparent from the following description of the diagram shown in FIG. 1a.

When the address indicator of a station indicates the address of the station, the latter obtains the right to transmit, which means that this station is due to transmit a message on the channel (100). At the instant at which the station obtains the right to transmit, an inactive-time counter is started (101). The inactive-time counter forms part of the elements constituting said pilot station. Two possibilities can be considered (102): either the station which has received the right to transmit is present and operates normally, or its is absent so that it does not react to the allocation of the right to transmit.

When the station is present (M), it transmits the message it intended to transmit, for example, the message stored in its memory; if it has no message to be transmitted, it transmits a presence message according to the process. The transmission of a message of any type stops (103) the inactive-time counter and resets the counter to zero. The resetting to zero of the time counter may also be performed just before the inactive-time counter is started.

When the station is absent, the inactive-time counter is not stopped by the transmission of a message of any type, which means that it will exceed (D) a predetermined value which is indicative of a silent station. The exceeding of the predetermined value by the inactive-time counter causes the transmission of a substitution message (SUB) by the pilot station (104) and stops the inactive-time counter.

The end-of-message indication of a message (data message, presence message, substitution message, etc.) transmitted on the channel then causes (105) the incrementation of said address indicators by one position. This end-of-message indication may be formed either by a few bits added to the end of the message as described in U.S. Pat. No. 4,227,178, or by the trailing edge of the carrier for the message transmitted on the channel.

Due to the incrementation of the address indicator, the right to transmit is allocated to another station of the network. After each of the stations connected to the channel has received the right to transmit, a new cycle can be started during which each station will again be allocated the right to transmit. For this it is necessary to reset the address indicators of all stations. In order to start the resetting of the address indicators in time, it is tested (106), for example by means of a comparator, if the logic communication loop has been completed, i.e. if all stations have had the right to transmit. If the loop has indeed been completed, resetting (107) of the address indicators takes place. This resetting operation is performed by resetting the pointer to an initial position when use is made of a pointer, or by resetting to zero when use is made of an allocation counter. Such resetting to zero of the allocation counter is for example, performed by a reset to zero message (RAZ) which is transmitted by the pilot station when use is made of simple allocation counters.

After the incrementation of the address indicators and, if necessary, their resetting, the process is repeated (100) for a next station.

A preferred embodiment of the invention will now be described in detail. It is assumed that in this preferred embodiment "n+1" stations are connected to the channel which is of a bi-directional type. The pilot station bears the number "0" and all other local stations have a number from 1 to n as their own address. It is to be noted that each station has a different number. For the address indicators use is made of allocation counters which are incremented in reaction to the trailing edge of the carrier of a message transmitted on the channel.

First the feasible formats of the messages will be described, followed by a description of the operation of the network. The following types of messages exist (a distinction is made between short and long messages):
Among the short messages there are essentially:
Message of the type RAZ: length 8 bits (reset to zero)
Message of the type RAE: length 2 bits (nothing to transmit) i.e. the presence message.
Message of the type SUB: length 4 bits (substitution)
These first three types of message are very short; they are so-called service messages which will not crowd the channel; they could all have the same length with different bit values, but for reasons of efficiency preference is given to different lengths in order to avoid any ambiguities in the preferred embodiment described. Only the first bit of the message is always zero for Manchester code auto-synchronization, but the other bits may assume different useful values; however, this does not directly concern the present invention. The general shape of the long messages is as follows:

| Preamble | Service | Address | Data | Check |
|---|---|---|---|---|
| 1    8 | 9   10   11 | 14   15   24 | 25 | |
| (8 bits) | (6 bits) | (10 bits) | | (16 bits) |

Bit No. 1 is always "0"; this is the auto-synchronization bit. The bits 2 to 8 are not important for the invention; they may be used for physical verification of the quality of the message, for example, automatic control of the required gain as a function of the electrical power of the message received.
Bit No. 9 is "1" in the addressed mode; a single destination station; it is "0" in the broadcast mode: several destination stations.
Bit No. 10 is "1" for the format NORMAL; it is "0" for the format REPEAT i.e. a message in the format REPETE.
Bit No. 11 is normally "1"; it is "0" in the case of a message of the type REJETE.

Figure 1B:
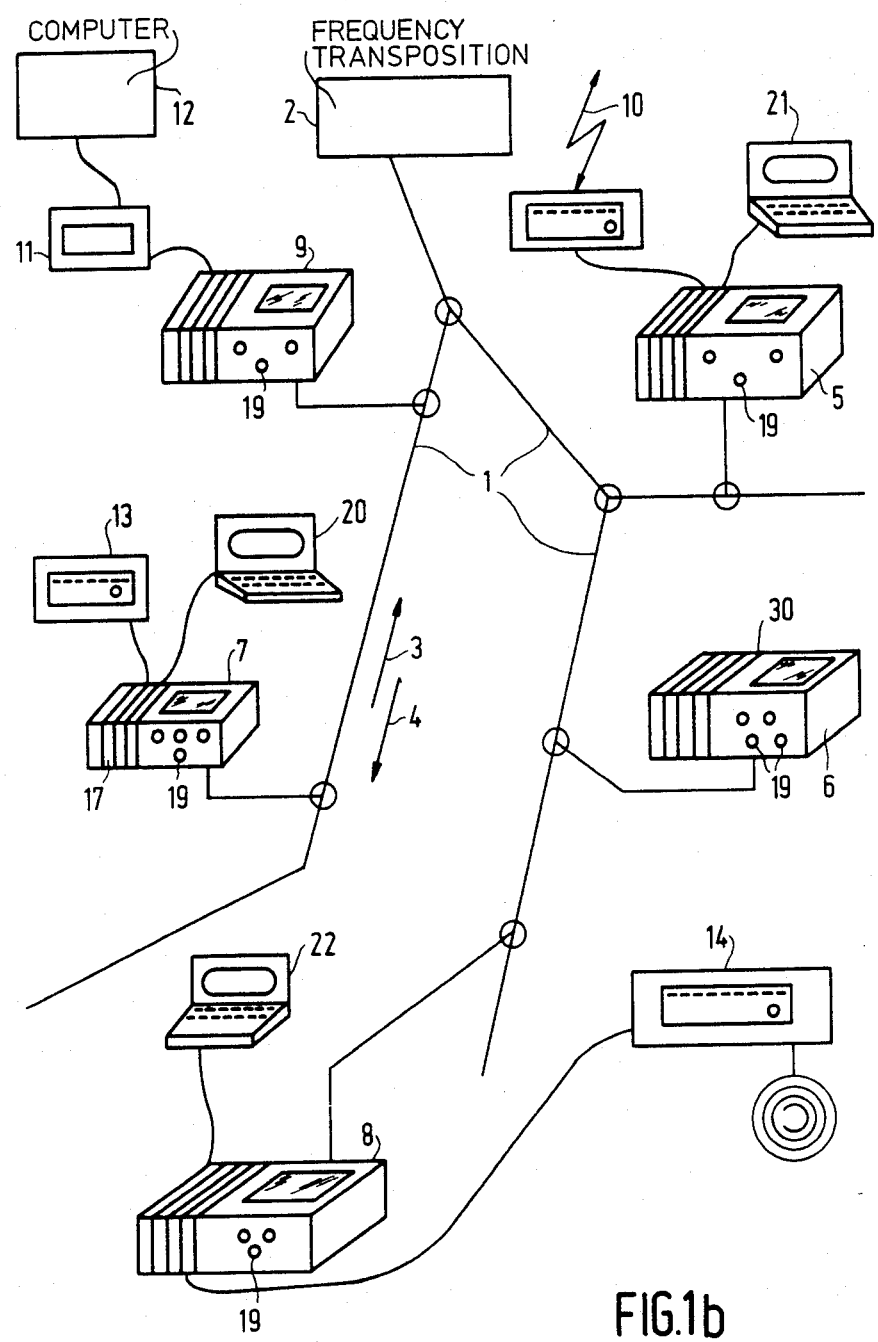
FIG. 1b shows a diagram of a local network.

The exact meaning of the formats normal, repeat and rejection will be described at a later stage.
The bits 12 to 14 do not directly concern the invention; they may be used for remote control or remote loading of the program for machines which do not have their own resources, for example, as described in French Patent Specification No. 79 02 524.
The bits 15 to 24 (10 bits) contain the destination of the message, that is to say either the number of the destination station in the addressed mode or in the broadcast mode the number of a known function of each station connected to this function.
As from the bit 25, in multiples of 8, the data are found in the form of octades in the described example; it may occur that there is no octade of data, for example, when only the transmission of a message of the type REJECTION is necessary. The maximum in the described example is 1024 octades of message data, but this is not a restriction inherent of the invention.
The last 16 bits are check bits -FCS- which enable a verification of the physical transmission by a method where, for example, the data field is divided by a generator polynomial; on this subject, see the ORANGE BOOK, Volume VIII. 2 of CCITT, notably section 2.2.7 thereof.
FIG. 1b shows the physical diagram of an example of a local communication network which consists of inter alia the following elements: a network of coaxial cables (1) which are interconnected and which may also be formed by optical fibers or other means and a frequency transposition device (2). The messages are transported in the network, for example, at a speed of 8M bis/s during transmission to the frequency transposition device (2) (this is the reverse channel (3)) with a carrier whose frequency is, for example, 48 MHz, and during the reception from the frequency transposition device (2), (this is the forward channel (4)) with a carrier whose frequency is, for example, 148 MHz. To the network there are connected modems (5, 6, 7, 8, 9). In the present example, each modem may be distributed between four stations, each station being formed by at least one board (17), that is to say an adequately equipped printed circuit board and in general by an apparatus connected to this board; however, a station may also be formed by only a board which can be controlled by an operator by means of buttons and lamps (19) on the control panel of each modem (6). Most local networks comprise apparatus which can be connected to each board; these apparatus correspond to the various functions of an organization; calculation with a front end (11) and a computer (12), connection to a network, for example, of the type Transpac (10), word processing (13), management of data base stored on, for example, a disc carrier (14); evidently, this list is, of course, not limitative. These functions are accessed via terminals (20, 21, 22, . . . ) which are arranged in the various locations of the organization, each terminal being connected to one of the boards (17) associated with one of the modems (5, 6, 7, 8, 9). It appears that there are different types of stations and that no systematic relationship exists between these stations themselves; this will be dealt with hereinafter, notably with respect to the addressing of the messages.

In the network carriers of other frequencies which serve purposes other than the transmission of messages of the described local network may be transported, for example, television pictures, audio transmissions and even messages of one or more other local networks which utilize forward and reverse channel frequencies which differ from the frequencies used by the describe network.

For practical reasons, the frequency transposition device (2) often forms part of a "head-end" receiver which receives the transmission intended for a teledistribution network via a common aerial.

Referring again to the present local communication network, the pilot station will be, for example, the board (30) with or without apparatus connected thereto, each local station being formed by at least one board with an apparatus connected thereto. The following description concerns for each station only its section "board" which comprises, with the modem, the lower layers of the layer architecture. A layer architecture is to be understood to mean that a station is said to be divided into several parts (layers) each of which has one or more suitably defined functions. The various layers communicate among themselves by way of a communication line, for example, a bus. This layer board corresponds to the control layer of the logic links of the standard ISO/TC97/SC16 (OSI). The upper layers, for example, cession, presentation, application (terminology OSI) co-operate with the lower layers but they will not be described herein because they are essentially formed by logic and are well known.

Figure 2:
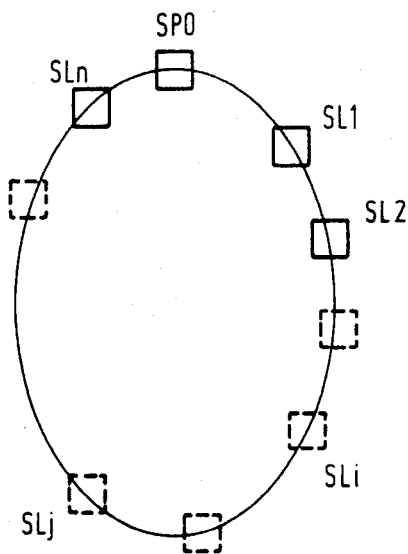
FIG. 2 shows the logic diagram of a local network.

The logic diagram of FIG. 2 illustrates how the various stations of the local communication network in accordance with FIG. 1b are addressed. The local stations are represented in the order of their number, SL1, SL2, . . . , SLi, . . . SLj, . . . SLn, the pilot station being represented by SPO with the number 0; there are "n+1" stations in total. In the described network, the maximum value of "n+1" is 1024, but this is not a limit.

Figure 3:
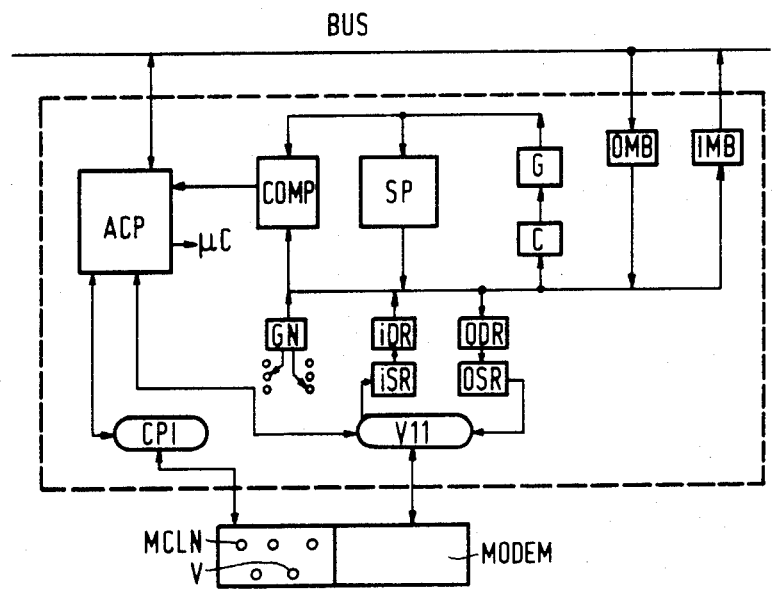
FIG. 3 shows the construction of the pilot station.

FIG. 3 shows the construction of the pilot station; the pilot station communicates with its modem via the interface V11 (standard CCITT, recommendation V11 of the ORANGE BOOK, Volume VIII.2 of CCITT) and possibly with the upper layer, if present, via the BUS which comprises data lines, address lines and control lines, thus permitting communication with a processor of said upper layer via an input mail box IMB or output mail box OMB; the interface V11 is connected to the input series register ISR which itself is connected to the input parallel register IDR and also to the output series register OSR which itself is connected to the output parallel register ODR; the counter C and the gate G enable modification of the content of the internal (scratchpad) registers SP; the gate GN enables the value "n+1" (=total number of stations connected to the network) which is physically preprogrammed on the board with, for example by tabs, to be applied to an input of the comparator COMP; these tabs enable the value "n+1" to be changed as the number of stations of the network changes. The automatic control system (ACP) of the pilot station controls the operation of the pilot station; it communicates with the control panel of the modem via the interface CDI, with the modem via the interface V11, with the upper layer via the BUS; the control panel of the modem comprises at least one signal lamp V and a re-initialization button MCLN (master clean not) which causes the internal logic of the modem and all boards connected thereto to be reset to zero; the automatic control system ACP will be described with reference to FIG. 5.

Figures 4, 7, 8:
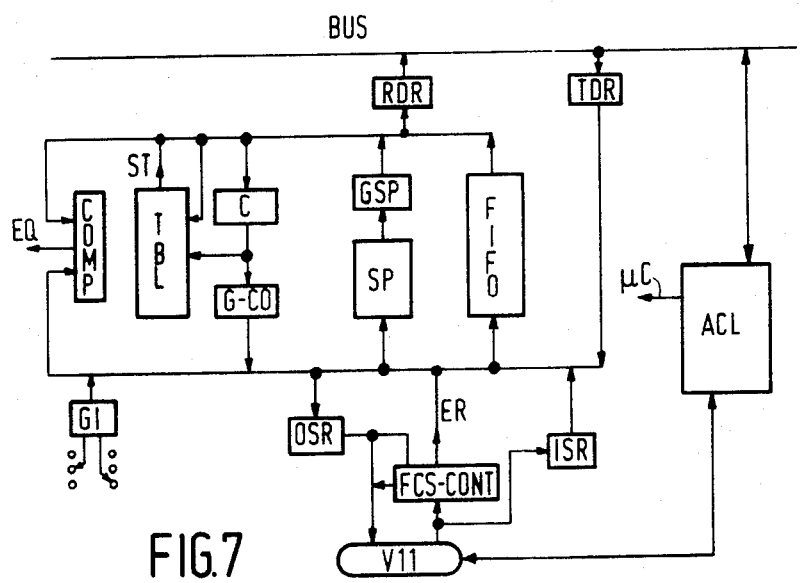
FIG. 4 shows the content of the internal registers of the pilot station.
FIG. 7 shows the construction of a local station.
FIG. 8 shows the content of the internal registers of a local station.

FIG. 4 shows the content of the internal registers SP of the pilot station. These internal registers are formed by two integrated circuits Signetics 74LS189. For the chosen application they comprise 16 times 18 bits, for example, from top to bottom;

CA-NL, NH=allocation counter.
REJ-NL, NH=counter for the number of rejection messages.
COT-NL, NH=counter for the number of transmitted octades.
CTC1-NL, NH=time counter for the cycle No. 1.
CTC2-NL, NH=time counter for the cycle No. 2.

Of these counters only the allocation counter is of direct importance for the invention; the other counters serve to record the useful service data for the monitoring and the control of the network; these data can be used, for example, by the upper layer of the pilot station; the cycle time counter is double, because it must switch from one to the other each time when a meassage of the type RAZ is transmitted, as will be described hereinafter.

Figure 5:
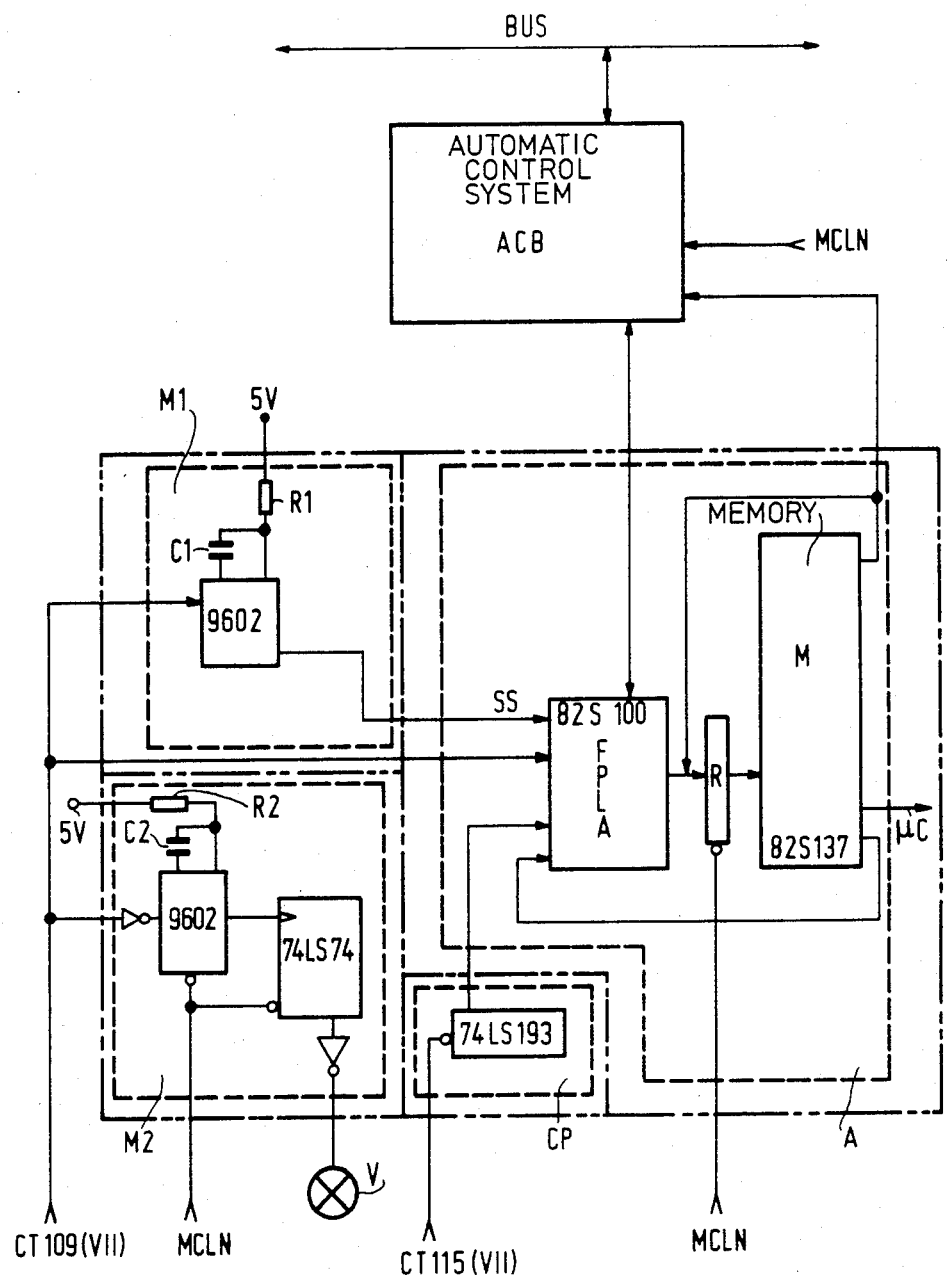
FIG. 5 shows the automatic control system of the pilot station.

FIG. 5 is a detailed representation of the automatic control system (ACP) of the pilot station with the connections to the interface V11: CT 115—receiver signal element timing and CT 109—data channel received line signal detector (see the ORANGE BOOK, Volume VIII-1, Recommendation V24 of CCITT, FIG. 2) and the connections to the control panel of the modem: re-initialization button MCLN and lamp V. The automatic control system of the BUS (ACB) will not be described in detail, because it is of no direct importance for the invention. Actually, it is optional in as far as it provides the connection to the upper layer of the pilot station. However, the sequencer in which four principal sections can be distinguished will be described: a counter CP for the number of bits of the input messages, for example a Signetics circuits 74LS193, is connected on the one side to the interface V11, via CT 115, and on the other side to the programmable logic unit FPLA of the assembly A; an assembly M1 which is formed by a monostable multivibrator, for example, a Fairchild circuit 9602, whose time constant M1-MAX which is determined by the passive elements R1 and C1; an assembly M2 which is formed by a monostable multivibrator, for example, a Fairchild circuit 9602 whose time constant M2-MAX is determined by the passive elements $R_2$ and $C_2$; the assembly M2 also comprises a storage device, for example, Signetics 74LS74. The assemblies M1 and M2 are connected to the modem via the line CT 109. The assembly A is a microprogrammed automatic control device, for example, of this type Mealy which controls the operation of the pilot station; it is formed essentially by a read-only memory M, for example, Signetics 82S137, and a programmable logic arrangement, for example, Signetics 82S100.

Figure 6:
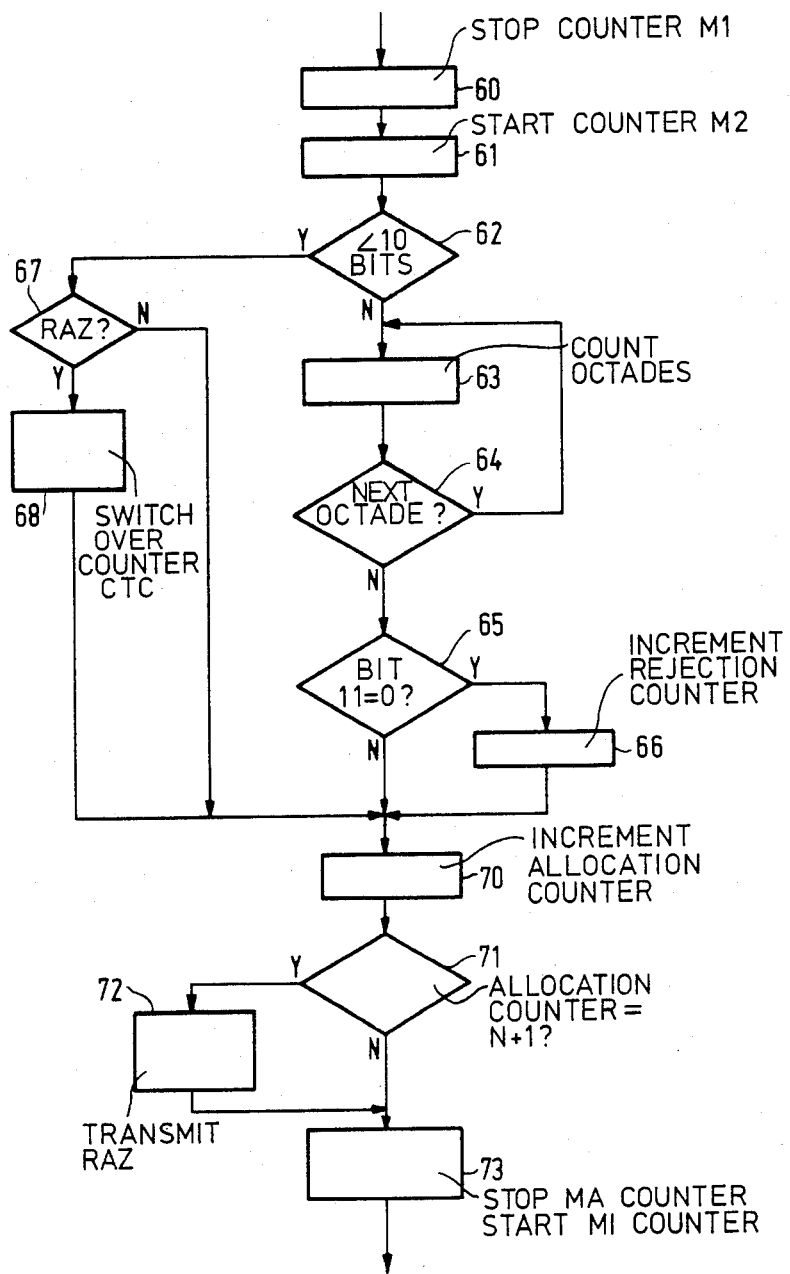
FIG. 6 illustrates the operation of the pilot station.

The function of the various elements will be described with reference to FIG. 6 which illustrates the operation of the pilot station under the control of the programmable logic sequencer FPLA. The leading edge of the carrier, indicative of the start of a message, and the trailing edge of the carrier, indicative of the end of a message, are signalled by the changing of the state of the line CT109 in accordance with the said standard. Upon each start of the transport of a message of any kind on the channel, the following procedure is started in the pilot station;

Stopping of the time counter M1 (60) (assembly M1).
  The counter M1 serves to detect a silent station; this will be dealt with hereinafter.

Starting of the time counter M2 (61) (assembly M2).
  The counter M2 serves to detect stations which are referred to as "chatterbox" stations, that is to say stations whose message has a length which exceeds the permitted maximum length; this is indicative of a fault which causes an excessively long transmission or even a continuous transmission, for example, a faulty modem.

Verification whether or not the message comprises less than ten bits (62) by means of the bit counter CP. This is the case for the short messages (RAE, SUB, RAZ). If a trailing edge of the carrier is detected very soon, a short message of 2, 4 or 8 bits is concerned, signalled by the counter CP, and the operation proceeds directly to (70) after the switching over (68) of the cycle time counter CTC of the internal register SP if the message was of the type RAZ (67). The switching of the counter CTC when the message is of the type RAZ causes the resetting to zero of the allocation counter of the pilot station as well as of the allocation counter of all local stations, thus signifying a new transmission cycle.

If no short message is concerned, the counting of the data octades in COT (63, 64) is performed by the counter CP and, at the end of the message, the counter for the rejection messages is possibly incremented by +1 (66) if the bit No. 11 was "0" (65).

At the end of the message, the trailing edge of the carrier causes the incrementation of the allocation counter by "+1" (70) and subsequently the value of the allocation counter is compared, by means of the comparator COMP, with the value "n+1" (=total number of stations) fixed in GN (71); correspondence means that each station has had the opportunity to transmit, and the pilot station then transmits a message of the type RAZ via ODR and OSR (72). In all cases the sequence is terminated by the stopping of the time counter M2 and the starting of the time counter M1 (73) under the influence of the trailing edge of the message carrier.

During the entire procedure the time counter M2 was in operation and if it has not been stopped by the trailing edge of the carrier, indicative of the end of a message, it may have reached the maximum value M2-MAX which is indicative of a "chatterbox" station; in that case the signal lamp V on the control panel of the modem of the pilot station lights up; the operator should then re-initialize the network with the re-initialization button MCLN of the modem after removal of the fault.

As has already been stated in the description of the procedure, the time counter M1 is started at the end of the sequence by the trailing edge of the message carrier and is stopped at the beginning of the sequence by the leading edge of the message carrier transmitted on the channel. However, if no message is transmitted on the channel by the station having the right to transmit, the time counter M1 is continuously incremented because it is not stopped and it can reach the value M1-MAX which is indicative of a "silent" station. When the value M1-MAX is reached, the signal SS (silent station) is generated and the sequencer A causes the transmission of the standard substitution message of the type SUB to the modem via ODR and OSR. The transmission of the substitution message stops the counter M1 (60) and the procedure described with reference to FIG. 6 will be started again. The allocation counter can thus be incremented by "+1" (70), thus allocating the right to transmit to another station of the network. This demonstrates that a silent station will not block the operation of the system.

For the description of a local station it is to be noted that some of the described elements of the pilot station in the preferred embodiment are essential for the operation of a network in accordance with the invention:
the comparator COMP, because it initiates the transmission of a message of the type RAZ, thus starting a new cycle;
the time counter M1, because it detects any silent station, thus causing the transmission of a substitution message of the type SUB which ensures the incrementation of the allocation counters.

FIG. 7 shows the construction of a local station whose board is situated between the modem, the interface V11, and the apparatus of the upper layer (not shown) with which the exchanges take place via the BUS.

The input messages arrive in the input series register ISR via the interface V11; for a long message, the last 16 bits (FCS) enable a test to be performed by the control device FCS-CONT, for example, a Signetics circuit 8X01 which, as the case may be, will set the error signal ER in order to cause on the one hand the setting of the bit REJETE in the next message to be transmitted and on the other hand to memorize in the TABLE that the station is in the recuperation state with respect to the station transmitting said rejected message; the data octades of the input messages are stored in the input waiting file IFIFO before being transmitted to the upper layer under the control thereof via the register RDR. When the waiting file is full so that input data are liable to be lost, the local station can transmit this overflow information, for example, by setting the bit REJETE, and the other stations can take this into account.

The gates G-SP and G-CO associated with the counter C enable modification of the content of the internal register SP; via the gate Gi, an input of the comparator COMP can receive the value "i" which is the number of the local station which is set, for example, by means of tabs; the other input of the comparator COMP receives the current value of the allocation counter present in the internal register SP and, in the case of correspondence, the signal EQ indicates that the relevant local station has the right to transmit a message. The allocation counter of each local station is incremented by "+1" in reaction to the trailing edge of the carrier of each message transported on the channel.

The memory TABLE of the relevant local station contains "1024" positions in which for each of the other local stations it is stored on the one hand whether the relevant station has been the subject of a message REJETE, the recuperation state, and on the other hand whether said station is active or not, depending on whether it has been substituted by the pilot station it during its turn to transmit; the upper layer can be informed (ST) of any change of the state of a bit of the table. The messages to be transmitted by the upper layer are transported via the parallel register TDR and are transmitted via the output series register OSR which adds the bits FCS thereto and which sets, as the case may be, the bit REJETE.

FIG. 8 shows the content of the internal register SP of a local station; the allocation counter CA-NL, NH is incremented in reaction to each trailing edge of the carrier; the destination address of the next message to be transmitted, DESTAD-L, H, originating from the upper layer, is loaded from the BUS.

Figure 9:
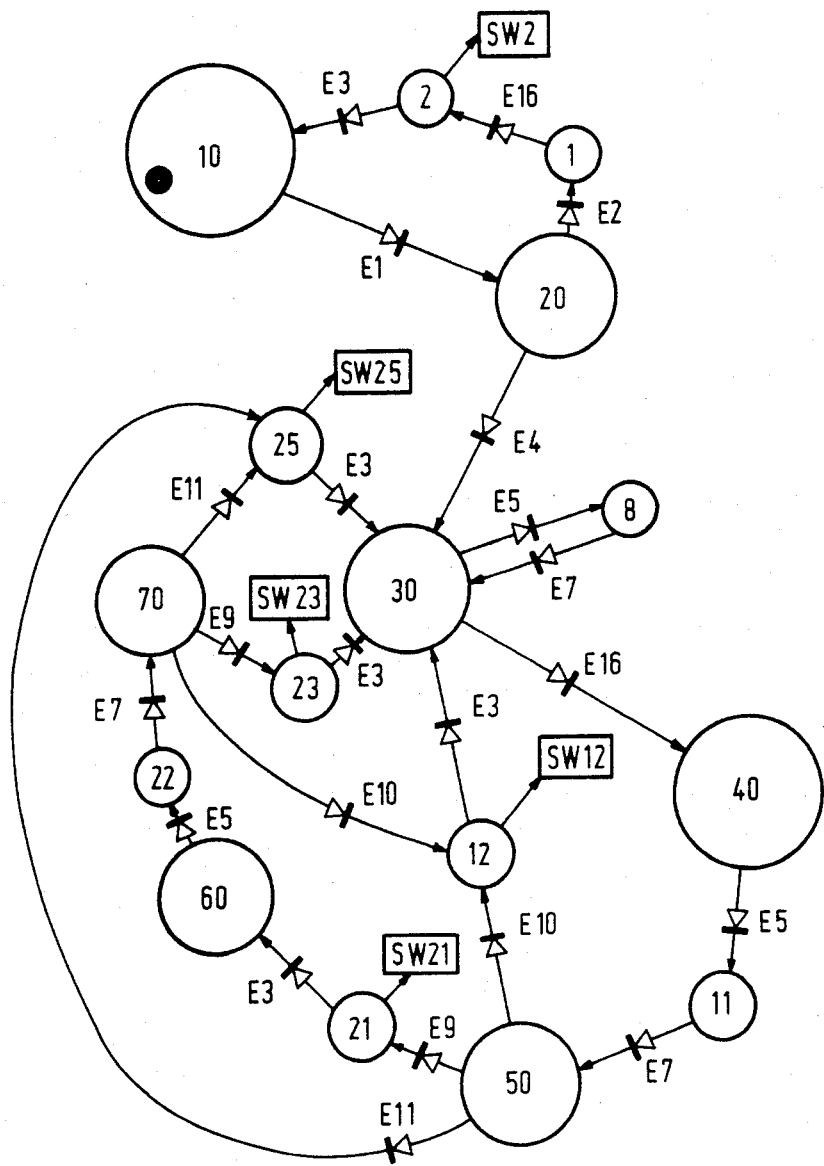
FIG. 9 shows the successive states of the control system of a local station.

FIG. 9 shows a preferred mode of operation of the automatic control system (ACL) of a local station in the form of a Petri network; the stable states of the automatic control system, that is to say the states awaiting an event, are represented by the larger circles; the smaller circles represent the execution of a microprogrammed sequence; the events which originate from the upper layer or the lower layer and which cause the changing over from one state to another are denoted by "En"; when the automatic control system signals an event to the upper layer, the symbol "Swe" is used; when an event has thus been signalled, the automatic control system waits for "reception acknowledged" from the upper layer, "E3", before changing over to the next state. The following events are encountered in FIG. 9:

E1 Reception of a message of the type RAZ.
E2 Reception of a message other than SUB.
E3 Reception acknowledged by the upper layer.
E4 Reception of a message of the type SUB.
E5 Allocation of the channel to the station i (this is the signal EQ transmitted by the comparator COMP of FIG. 7).
E7 Trailing edge of the carrier of a message (CT109).
E9 Reception of a message REJETE, without overflow of the IFIFO, of the last message transmitted.
E10 Reception of the message REJETE because of overflow of the IFIFO of the last message transmitted.
E11 Implicit reception acknowledgement from the destination station (stations) of the last message transmitted.
E16 Request for transmission of a message from the upper layer.

There are two modes of communication between the stations: the addressed mode and the broadcast mode.

In the addressed mode, the bit No. 9 of the message is set to "1", and the number "j" of the destination station is set in the address zone of the message, bits 15 or 24; therefore, there is only one destination station and hence, if the latter does not transmit REJETE upon the first transmission allocation, that is to say when its allocation counter corresponds to "j", the message has been properly received.

In the broadcast mode, the bit No. 9 of the message is set to "0", the address zone of the message, bits 15 to 24, is provided with a logic number which corresponds, for example, to one of the functions of the organization whereto several apparatus are attached, and hence several communicating stations; in the broadcast mode, a local station does not "know" which other local stations are connected to the relevant logic number and hence are destinations of the transmitted message, the more so because the situation may change during each cycle of the allocation counter, depending on the operators of each station; therefore, after the transmission of a message in the broadcast mode, the transmitting station "i" must "listen to" all the stations during a complete cycle of the allocation counter from "i" to "i+(n+1)", disregarding the intermediate resetting to zero, and if a single station transmits a message of the type REJETE during this cycle, the station "i" must retransmit the same message in the mode REPETE (REPEAT).

The various stations communicate with one another, some in the addressed mode and others in the broadcast mode, the entire procedure taking place simultaneously. The "listening" mode of a station only differs in function of the last message it has transmitted itself:

if was transmitted in the addressed mode, it only "listens" for the acknowledgement of its message by the destination station;

if it was transmitted in the broadcast mode, it "listens" to all stations and, depending on the result, i.e. rejection signal or not, it retransmits the same message or not in the mode REPETE.

The transmission of a message of the type REJETE is general, which means that a station which transmits this message does not specify which is or which are the origin or origins of the message or messages which it has not correctly received. However, this is not very important because the transmitting station can "know" the origin of the messages of the type REJETE by reading its allocation counter. The transmitting stations awaiting acknowledgement, that is to say the stations "in the listening mode" with respect to said station, will retransmit the message in the mode REPETE.

In the described embodiment, the mode REPETE is provided once at the level of the described physical layer, but this is not a limitation.

The following description of the Pétri network only deals with the operation of the automatic control system of a station in the broadcast mode; the addressed mode which is only a simple form of the broadcast mode is not elaborated. The initial stable state of the local station, caused by the application of the voltage or the reinitialization IMCLN), is the state 10; when the station is started, the automatic control system awaits the event E1, reception of a message of the type RAZ, in order to change to the state 20; as from that instant, its allocation counter is synchronized with all others; subsequently, an observation cycle commences in order to check whether another station of the same number "i" is already connected to the network; when the event E4 occurs, reception of a message of the type SUB, when the allocation counter corresponds to "i", no other station number "i" is connected to the network, and the station may become operational and change to the state 30; if the event E2 occurs, reception of a message other than SUB, which means that a station "i" is already connected to the network, it changes to the state 1 and as soon as the upper layer requests the transmission of a message, E16, it changes to the state 2 in which the upper layer is informed, -SW2, after which the reception acknowledgement E3 is awaited before returning to the state 10; at this instant, the action of the operator may be, for example, the changing of the value determined by the tabs Gi of FIG. 7.

Having reached the state 30, if the automatic control system has nothing to transmit, it starts to switch between the states 30 and 8 with the transmission, in the state 8, of a message of the type RAE when the allocation counter reaches the value "i" (event E5) the return taking place in reaction to the trailing edge of the carrier, event E7.

If there is a transmission request E16, the state 40 is reached in which the message composed by the upper layer and assembled by the sequencer is ready to be despatched. In the case of a message REJETE, the bit No. 11 is set to 0. The message is despatched in the state 11 as soon as the channel has been allocated to the station "i" (event E5); in reaction to the trailing edge of the carrier, E7, the state 50 is reached in which the automatic control system "listens for the response" of the other stations during a complete cycle of the allocation counter in order to learn about any reception problems. Three cases may occur:

firstly, in the case of a message REJETE due to overflow of the IFIFO of a station, E10, the state 12 is reached in which the upper layer SW12 is informed before returning to the state 30 upon reception acknowledgements E3;

secondly, it there has not been any message REJETE, which implicitly means that the message has been correctly received by the local destination station or stations, E11, the state 25 is reached in which the upper layer is informed that everything is in order, SW25, before returning to the state 30 (E3);

thirdly, if there has been a message REJETE, E9, because of a transmission error, FCS error, the state 21 is reached in which the upper layer SW21 is informed, after which, E3, after reception acknowledgement from the upper layer, the state 60 is reached in which retransmission of the same message in the mode REPETE can take place, state 22, that is to say with the bit No. 10 of the message set to "0", as soon as the channel is allocated again, E5; in reaction to the trailing edge of the carrier, E7, the state 70 is reached in which the same three cases can again occur;

firstly, E10, reception of a message REJETE, because of the overflow of the IFIFO, of the last message transmitted, return to the state 12 already described;

secondly, E11, implicit reception acknowledgement from the local destination station (stations) of the last message transmitted, return to the described state 25;

thirdly, E9, reception of a message REJETE, without overflow of the IFIFO, of the last message transmitted, change over to the state 23 in which the transmission error is confirmed, SW3, to the upper layer before returning to state 30.

In the state 50, like in the state 70, the events E9 and E10, excluding the event E11, are not mutually exclusive; usually the event E9 is granted priority over the event E10. The fact that a rejected message caused by overflow of the IFIFO of a station is not retransmitted (first case) is a preferential form whereto the invention is not restricted. In the latter case it is equally well possible to retransmit the message by following the procedure described for the third case.

The operation of the microprogrammed automatic control system of a local station "i" during the transmission of a message has been described; during the reception of a message transmitted by a station "j" (j≠i), the automatic control system reacts in function of the received message; this will be described hereinafter without repeating the description for the messages which are responses to previously transmitted messages.

Upon reception of a message of the type RAZ, (E1), the allocation counter is reset to zero.

Upon reception of a message of the type RAE, the information "station present" is memorized in the table (FIG. 7) on the line "j" corresponding to the value of the allocation counter, that is to say to the number of the transmitting local station; if this is a change of the state of the station "j", for example, a station which was absent has become "present", this information is transmitted to the upper layer.

Upon reception of a message of the type SUB, in symmetry with the preceding message RAE, the information "silent station" is memorized in the table and, if this is a change of the state of the station "j", the information is transmitted to the upper layer. Each station is thus informed about the state of the other stations.

Upon reception of a long message, first the same operations are carried out as for the reception of a message RAE; subsequently, the check bits FCS are treated. If there is an error, the bit REJETE No. 11 is set to "0" in the message transmitted during the next allocation of the channel, and in the table it is memorized that the station "i" is in the recuperation state with respect to the station "j", except when it was already in this state, which means that the transmission error is confirmed, the latter information then being transmitted to the upper layer. If the check bits FCS are correct, the address mode is analyzed (analysis of the value of the bit No. 9). If the bit No. 9 of the message received is "1", a message in the addressed mode is concerned, and the station "i" verifies whether the address field corresponds to "i", which indicates that the station "i" is the destination of the message. If the station "i" is the destination of the message received, the message is accepted. If the station "i" is not the destination station, the message is ignored.

If the bit No. 9 of the message received is "0", a broadcast mode message is concerned and the station "i" verifies if the logic number mentioned in the address field corresponds to one of its functions. If this is the case, the station "i" accepts the message received; otherwise. the message is ignored. Subsequently, the bit No. 10 of the message is tested and, if it is "0", a message REPETE is concerned which is ignored if the station "i" is not in the recuperation state with respect to the transmitting station "j"; this information is available in the table. If the station "i" is in the recuperation state with respect to the transmitting station, the message will be accepted. If the bit No. 10 is "1", the message is accepted.

A message which has been accepted by the station "i" is thus memorized and made available to the upper layer.

What is claimed is:

1. In a local data communication network, comprising a plurality of transmitter/receiver stations, each of which is connected to a transmission medium for the transport of data, said stations forming a logic communication loop, each station having its own address and comprising an address indicator, a method of controlling the transmission/reception of data in said network said method comprising the step of:
   (a) allocating the right to transmit to the station whose own address corresponds to the address indicated by the address indicator;
   (b) transmitting a single message by the station having the right to transmit and, if this station has no information to be transmitted when it is allocated the right to transmit, transmitting a presence message by said station;
   (c) incrementing said address indicators by one position by an end-of-message indication of the message transmitted by the station having the right to transmit;
   (d) resetting said address indicators when each of said stations has had the right to transmit;
   (e) detecting by a given station, referred to as the pilot station, of the absence of transmission of a message of any type by the station having the right to transmit;
   (f) transmitting by said pilot station of a substitution message after the detection of said absence of transmission.

2. A method as claimed in the first claim, in which a message received by a station is stored in a memory having a limited capacity, and in which a rejection signal is transmitted on the transmission medium by said receiving station in the case of overflow of the memory, of limited capacity.

3. A method as claimed in claim 1 comprising the steps of:
   (a) verification, in accordance with a given standard, by the receiving station of a received message;
   (b) generation of a rejection signal by said receiving station when said verification reveals that the given standard is not met;
   (c) transmission of said rejection signal by said receiving station;
   (d) reception of said transmitted rejection signal by the transmitting station which has transmitted said message which has been the subject of the generation of a rejection signal;
   (e) retransmission by the transmitting station of said message which has been the subject of the generation of said rejection signal.

4. A method as claimed in any of the claims 2 or 3, in which each message comprises several bits which are arranged in a defined order, said transmission of the rejection signal being realized by setting at least one bit in a first given location to a given value.

5. A method as claimed in claim 3, in which each message comprises several bits which are arranged in a defined order, said retransmitted message comprising at least one bit which is set to a given value in a second given location of the message for indicating that the message is retransmitted.

6. A method as claimed in claim 1, in which the resetting of said address indicators is realized by means of a resetting message transmitted by the pilot station, and wherein a station other than the pilot station (a station which is referred to as a local station) starts to use the transmission medium, an observation cycle is performed by said local station, said cycle comprising:
   (a) waiting by said local station for a resetting message to be transmitted by the pilot station;
   (b) reception of the resetting message;
   (c) waiting for the indication of its own address by its address indicator;
   (d) when its own address is indicated by its address indicator, verification of the transmission by the pilot station of a substitution message and, upon reception of said substitution message, the termination of the observation cycle;
   (e) when said substitution message is not received when its own address is indicated by its address indicator, activating an error signal.

7. A local data communication network, comprising a plurality of transmitter/receiver stations, each of which is connected to a transmission medium for the transport of data, said stations forming a logic communication loop, each station having its own address and comprising an address indicator, each station further comprising:
   allocation means for allocating the right to transmit to that station when its own address corresponds to the address indicated by its address indicator;
   transmission means for transmitting a single message, said transmission means having a control output connected to said allocation means and being activated under control of said allocation means, said transmission means being provided for transmitting a presence message if no information has to be transmitted by that station when it is allocated the right to transmit;
   each of said address indicators being provided with incrementing means for incrementing them by one position by an end-of-message indication of the message transmitted by the station having the right to transmit; each of said address indicators being further provided with resetting means for resetting them when each of said stations has had the right to transmit; said data communication network comprising a pilot station, said pilot station comprising an inactive-time counter for measuring the duration of the inactivity of a station having the right to transmit and for generating a substitution message when the inactive-time counter exceeds a predetermined value.

8. A local data communication network as claimed in claim 7, comprising "n+1" (n) transmitter/receiver stations, each of said n stations, referred to as local stations, having a number from 1 to n as its own address, said pilot station bearing the number "0", said address indicator comprising an allocation counter, each local station comprising detection means for the detection of a substitution message, an input of said detection means being connected to an output of said allocation counter in order to receive the value indicated by the allocation counter, said detection means comprising a first memory for storing the number of a station which has been the subject of a substitution message.

9. A local data communication network as claimed in claim 7, in which each station comprises means for identifying types of messages, said means for identifying types of messages having an input connected to an output of said allocation counter in order to receive the value indicated by the allocation counter, said means for identifying types of messages comprising a second memory for memorizing a station which has been the subject of a rejection signal, generated by first rejection signal generating means which belongs to each station, said first rejection signal generating means being provided for generating a rejection signal when a received message has been verified to be incorrect in accordance with a given standard.

10. A local data communication network as claimed in claim 7, wherein each station comprises a third memory having a limited capacity for temporarily storing a received message, each of said stations having second rejection signal generating means for generating a rejection signal in case of overflow of said third memory.

* * * * *